United States Patent
Yamamuro

[15] 3,653,770
[45] Apr. 4, 1972

[54] APPARATUS FOR MEASURING THE DIMENSIONS OF OBJECTS

[72] Inventor: Hiroshi Yamamuro, Yokohama, Japan
[73] Assignee: Tokyo Shibaura Co., Ltd., Kawasaki-shi, Japan
[22] Filed: June 2, 1970
[21] Appl. No.: 42,808

[30] Foreign Application Priority Data
May 12, 1969 Japan..................................44/35993

[52] U.S. Cl.............................................356/160, 250/219
[51] Int. Cl....................................G01b 11/04, G01n 21/30
[58] Field of Search..........356/160; 250/219; 235/92, 151.32

[56] References Cited

UNITED STATES PATENTS

| | | | |
|---|---|---|---|
| 2,548,590 | 4/1951 | Cook | 356/160 |
| 3,050,857 | 8/1962 | Pierce et al. | 235/92 D |
| 3,024,986 | 3/1962 | Strianese et al. | 235/92 V |

Primary Examiner—Ronald L. Wibert
Assistant Examiner—Conrad Clark
Attorney—Oblon, Fisher and Spivak

[57] ABSTRACT

Apparatus for measuring the dimensions of objects including elongated light sources within a measuring zone with the opposite ends of each of the light sources being arranged over each of the edge portions of a sheet of web material to be measured. The light sources are positioned adjacent one side of the web material in a non-contact relationship such that the lengthwise direction of the light sources is positioned so as to coincide with the widthwise direction of the web. A pair of photoelectric transducers are provided adjacent the opposite side of the web in a non-contact relationship therewith such that the transducers are permitted to move along the lengthwise direction of the light sources when measuring the width of the web. A pair of magnetic reproducing heads are provided to move simultaneously with the photoelectric transducers when the web is being measured. A pair of magnetic scale members are provided and extend for a distance which corresponds to the length of movement of the magnetic reproducing heads. A pair of first registers are provided for counting during the period of time that the light beams emanating from the light sources are interrupted by the web whose width is being measured. The registers, when in operation, will count a plurality of marks which are magnetically recorded on the magnetic scale members as the magnetic reproducing heads move therealong. A second register is provided for counting an algebraic sum of reference pulses representing a predetermined width of web material and both pulses emanated from the pair of first registers.

7 Claims, 3 Drawing Figures

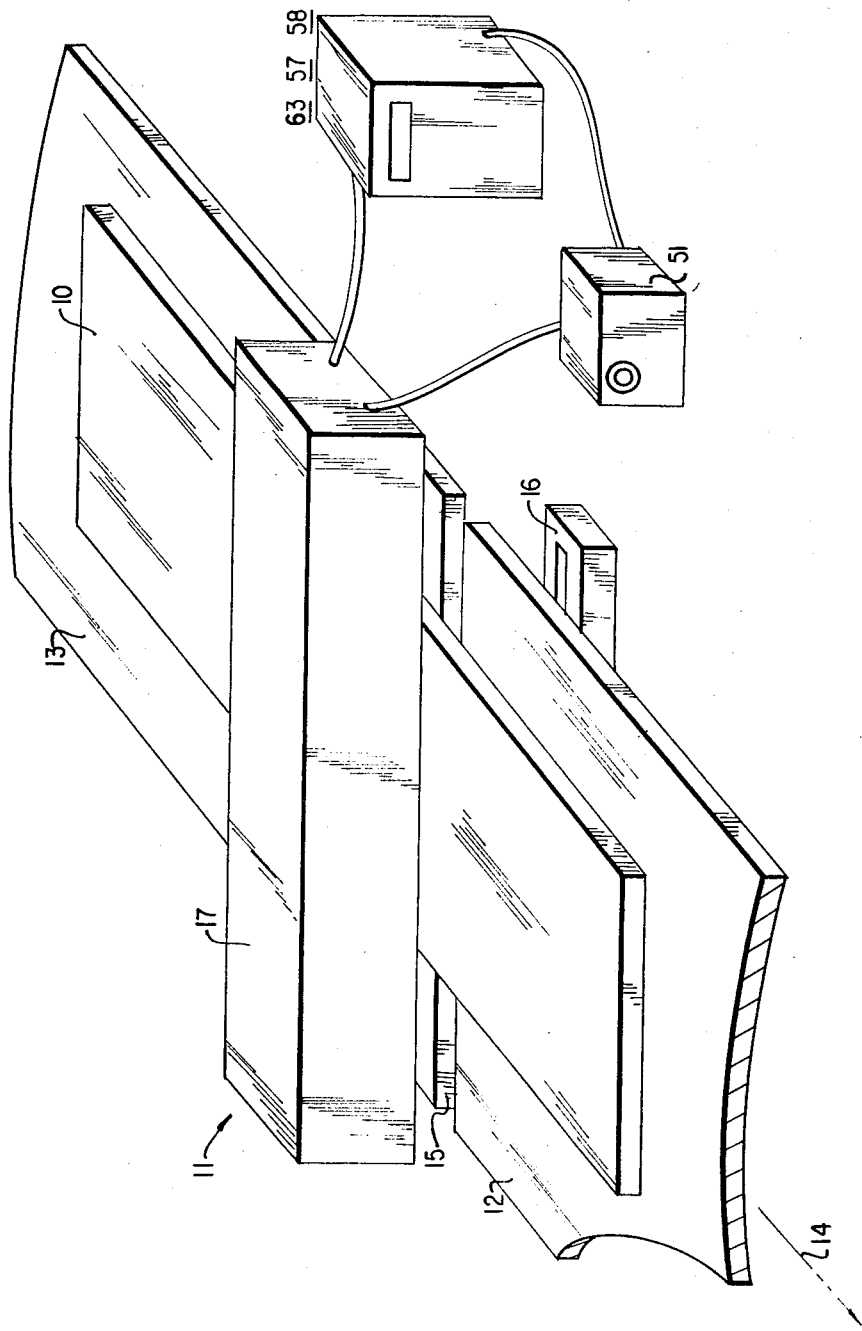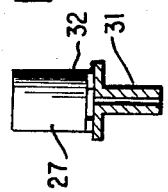

APPARATUS FOR MEASURING THE DIMENSIONS OF OBJECTS

BACKGROUND OF THE INVENTION

The present invention relates generally to an apparatus for measuring the dimensions of objects, and more particularly to an apparatus for measuring the width of successively fed sheets of web materials.

By way of example, in a rolling mill process for relatively thick steel sheets there is a demand for a way of readily and easily measuring the width of successively rolled steel sheets as they are fed to a width measuring zone by means of a conventional conveyor system.

In the past, various types of measuring apparatus have been utilized for measuring the width of rolled steel sheets. Generally, such measuring systems have employed an optical system for measuring the width of the steel sheets. Such prior art optical systems have generally included an elongated light source which is mounted upon a base portion of the conveyor system at a predetermined measuring zone and is positioned beneath the steel sheet to be measured and perpendicular to the direction of movement of the steel sheet. A photoelectric transducer is generally positioned above the light source such that it will receive the light beam emanating from the light source as it comes over the opposite edges of the steel sheet whose width is to be measured. An image of reduced size is then focused upon the plane of the photoelectric transducer and is scanned by a rotary scanner having slits located about the cylindrical body thereof. The photoelectric sensitive element of the photoelectric transducer will subsequently respond to the amplitude of the image passing through the scanner slits and will generate an electric output signal whose amplitude is proportional to the dimensions of the reduced image. The output signal of the photoelectric transducer is then employed as an indication of the measured value of the width of the steel sheets.

While such prior art optical systems have been somewhat satisfactory, it has generally been impossible to measure the width of the steel sheets within a high degree of accuracy, such as, within the 1 to 2 millimeter range. This lack of accuracy is a result of the necessity of measuring the reduced image of the steel sheets.

For example, if the above-described prior art apparatus is utilized for successively measuring the width of steel sheets having dimensions of equal width but of varying thicknesses, it can readily be seen that when a thick sheet is positioned between the transducer and the light source of the measuring apparatus, the image of the sheet focused within the focus plane of the transducer will be larger than that resulting from a thinner sheet in the same position.

Thus, it is apparent that significant errors in the measurement will result from the output of the transducer when sheets of differing thicknesses are being measured.

Also in the past, in an attempt to reduce the aforesaid error, a pair of transducers similar to that of the above-described example have been mounted on an inverse screw mechanism such that it is possible to move the pair of transducers in opposite directions to each other by reversibly rotating the inverse screw. As a result of using the inverse screw mechanism, the transducers may be set to scan only near the side portions of the steel sheet which is being measured.

Again, while somewhat satisfactory, as a result of the pair of transducers being located at the edge portions of the steel sheet and therefore only capable of scanning the side edge portions, error is introduced as a result of any increase in the sheet thickness.

Moreover, it can be seen that the above-described arrangement increases the complexity of operation in that the relative portions of the inverse screw mechanism for the pair of transducers have to be adjusted, by rotating the latter, every time steel sheets having differing widths are fed to the position at which they are measured. Additionally, this extremely troublesome operation is not only complicated but substantially increases the expense of the apparatus.

Furthermore, when utilizing the above-described system, when a steel sheet to be measured is located at an extreme over-center position between the pair of transducers, an even greater error in the measurement of the width of the sheet will result.

An improvement which was intended to remove the above-identified defects is disclosed in the U.S. Pat. application to Hiroshi Yamamuro, et al., Ser. No. 29,230, filed Apr. 16, 1970, for "AN APPARATUS FOR MEASURING THE DIMENSIONS OF OBJECTS", and assigned to the same assignee.

The aforementioned disclosure relates to apparatus for measuring the width of a web material including a carrier which travels across the web. The carrier has mounted thereon a photoelectric transducer, and a magnetic induction type pulse generator for enabling exact detection of the opposite edge portions of the web. An elongated magnetically recorded and fixed scale extends through the entire travel span of the carrier and is magnetically coupled to the pulse generator. The scale includes finely distributed magnetically recorded marks on the magnetic base thereof, along the lengthwise direction of the scale. A counter or register counts the pulses which emanate from the pulse generator in the absence of a detected electric signal from the photoelectric transducer, the absence indicating the presence of the web such that the opposite edge portions of the web are readily detected and measurement of the web width is made.

Though the before-mentioned measuring apparatus has given satisfactory results, there is somewhat of an inconvenience which is desirable to be removed in that the carrier mounted photoelectric transducer and the magnetic induction pulse generator or magnetic reproducing head should be moved over the entire span of the web every time the width measuring operation is repeated.

It can be seen that the above-identified operation may result in a somewhat slow measuring procedure which will create a significant obstacle for a rolling mill process in which the web materials to be measured are successively and rapidly fed into the measuring zone.

SUMMARY OF THE INVENTION

It is therefore a principal object of the subject invention to provide an improved apparatus for successively and rapidly measuring dimensions of web materials which are successively fed to a measuring zone such that it is possible to effectively increase the productivity of such products.

Another object of the subject invention is to provide an apparatus for measuring dimensions of web materials in which a pair of magnetic reproducing heads integrally attached to photoelectric transducers move along relatively short prerecorded magnetic bases which are respectively located only near the opposite side edges of the web material.

A further object of the subject invention is to provide an apparatus for measuring dimensions of objects in which the magnetic reproducing heads move at a high rate of speed along the relatively short recorded base portion with the photoelectric transducers by means of fluid actuators, whereby it is possible to effect a high speed measuring operation.

Still another object of the subject invention is to provide an apparatus for measuring dimensions of objects, in which reference pulses representing a reference width of web materials are provided and such pulses reproduced by the reproducing heads which are capable of movement respectively only along a defined stroke are substracted from or added to the reference pulses, whereby it is possible to quickly display the width of web materials on a register.

Briefly, in accordance with the present invention, these and other objects are in one aspect attained by providing elongated light sources in a measuring zone, the opposite ends of each of the light sources being respectively arranged over each of the edges of the web materials to be measured. The light sources are positioned adjacent one side of the web material in a non-contact relationship such that the lengthwise direction of the light sources coincides with the widthwise direction of the web. A pair of photoelectric transducers are provided adjacent the opposite side of the web in a non-contact relationship therebetween such that the transducers are allowed to move along the lengthwise direction of the light sources when measuring the width of the web. A pair of magnetic reproducing heads are provided and move in accordance with the movement of the photoelectric transducers such that they move in unision when measuring the web. A pair of magnetic scale members are provided and extend over a distance corresponding to the length of movement of the magnetic reproducing heads. A pair of first registers are provided for counting during the time period that the light beams emitting from the light sources are interrupted due to the web whose width is to be measured. The registers, when in operation, will count the marks magnetically recorded on the magnetic scale members as the magnetic reproducing heads are moved therealong. A second register is provided for counting algebraic sum of reference pulses representing a predetermined width of the web and both pulses emitted from the pair of first registers respectively.

BRIEF DESCRIPTION OF THE DRAWINGS

The present invention can be more fully understood from the following detailed description when taken in connection with reference to the appended Drawings, wherein:

FIG. 1 is a perspective view, partially broken away, of a measuring apparatus in accordance with the present invention;

DETAILED DESCRIPTION OF THE PREFERRED EMBODIMENTS

Figure 2:
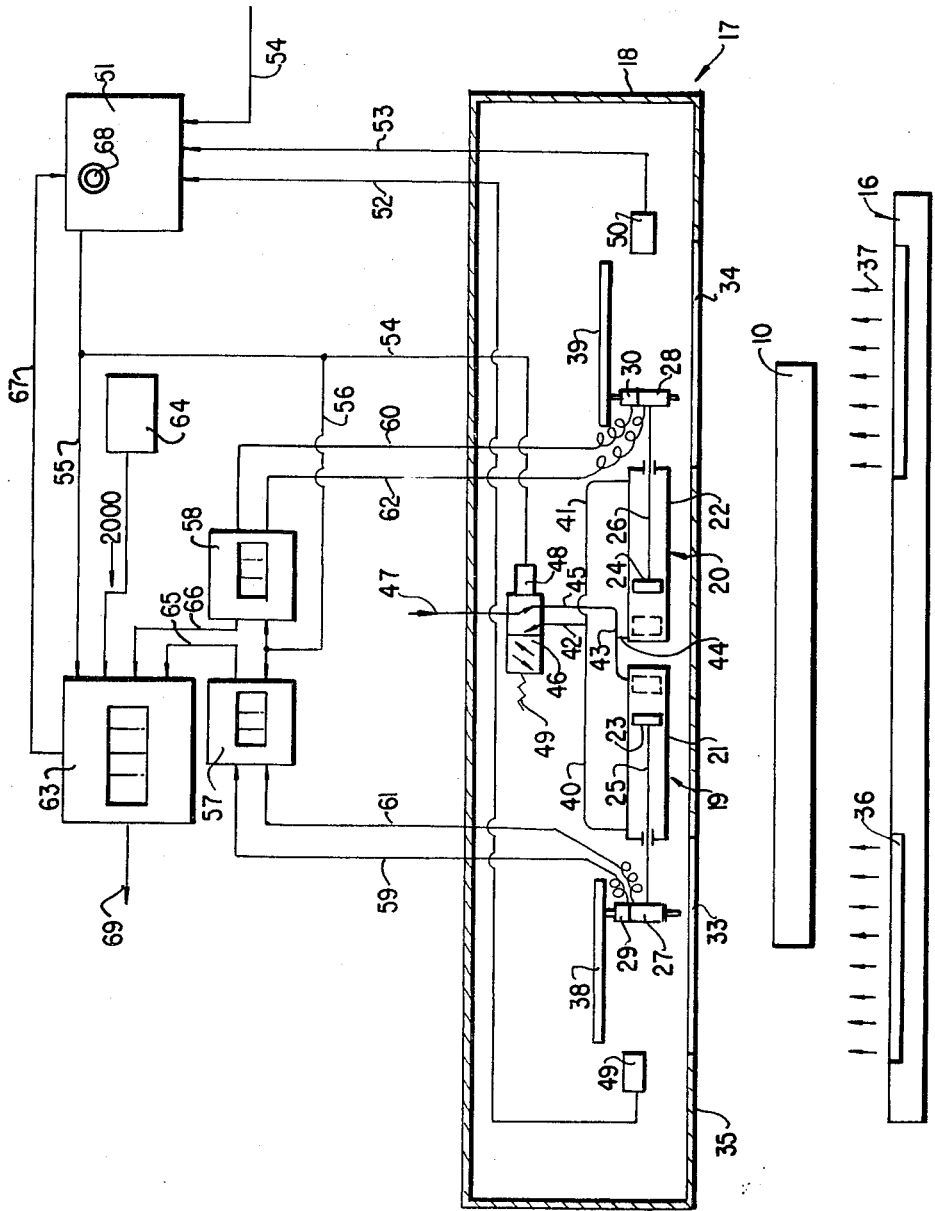
FIG. 2 is a schematic diagram showing sensor and register devices employed in the apparatus of FIG. 1; and, FIG. 3 is a partial sectional view of a photoelectric transducer of the type employed in the sensor of FIG. 2.

Referring now to the Drawings, wherein like reference characters designate identical or corresponding parts throughout the several views, and more particularly to FIG. 1, wherein there is shown a web or steel sheet 10 which has come to rest at a measuring zone 11 at which the width of the web or steel sheet is to be measured. The web has been fed through rolling steps prior to entering the measuring zone. In the preferred embodiment, the web is transported to the desired position by means of a carrier device including a pair of tables 12 and 13 arranged along the transfer direction of the web and mounted on a carrier (not shown). The tables 12 and 13 are arranged such that they are moved together along the direction shown by the arrow 14.

The gap 15 extends between the trailing end of the forward table 12 and the leading end of the trailing table 13 and extends across the full width of the tables. The width of the tables is substantially larger than that of web 10 which is to be measured. An elongated light source 16 which may, for example, be an elongated fluorescent lamp is mounted on a fixed base portion (not shown) of the device.

Light emitter from the source 16 is directed upwardly therefrom and passes through the gap 15. As can be readily seen, a portion of the light beam passing through the gap 15 will be interrupted due to the web portion while the remainder of the light beam will be passed upwardly through the gap along the opposite sides of the web. A sensor 17 is positioned above the tables 12 and 13 and spaced from the web with the sensor extended across both the tables and the web.

The sensor 17 is shown in detail in FIG. 2 and includes an enclosure 18 which, in turn, includes a pair of fluid actuators 19 and 20 having cylinders 21 and 22 and pistons 23 and 24, respectively, slidably located therein. The fluid actuators located within the enclosure have the piston rods 25 and 26 aligned with each other and positioned substantially parallel to the upper and lower surfaces of the web 10. Piston rod 25 extends through the left end wall of the cylinder 21, as shown in FIG. 2, and piston rod 26 extends through the right end wall of the cylinder 22.

The piston rods 25 and 26 bear photoelectric transducers 27 and 28 and electric pulse generators 29 and 30 or magnetic reproducing heads at the outer extended ends thereof. As shown most clearly in FIG. 3, each of the photoelectric transducers 27 includes an elongated tubular light guide 31 and a casing 32 with a conventional photoelectric sensitive element (not shown) therein.

The enclosure 18 includes a pair of elongated openings 33 and 34 at the base or bottom wall portion 35 thereof to allow the light beam emitted from light source 16 to pass therethrough.

As most clearly shown in FIG. 2, the openings 33 and 34 only lie over a predetermined length of the respective opposed side portions of the web 10. The length of the openings 33 and 34 are determined such that they provide the complete range of width of web material to be measured such that the innermost edges of the openings 33 and 34 are positioned inwardly of the web so as to be capable to measure the smallest width desired, and similarly the outermost edges of the openings are positioned outwardly of the web material such that the largest desired width can be measured.

As shown in FIG. 2, the light source 16 includes a pair of fluorescent lamps 36 and 37 mounted therein. The lamps 36 and 37 each have a length corresponding to that of the respective openings 33 and 34 and aligned therewith such that the light beam emitted therefrom will pass through the openings.

The length of stroke of each of the pistons 23 and 24 within the cylinders 21 and 22 are selected such that the photoelectric transducers 27 and 28 will be exposed to the light beam emitted from the lamps along substantially the entire length of the openings 33 and 34 along the transverse direction of the web. Thus, with the tubular guides directed toward the openings, the light beam will extend through the light guide to the photoelectric sensitive element so as to emit an electric signal responsive to the light beam.

A pair of magnetic scales 38 and 39 are provided and each scale includes a magnetically pre-recorded pulse train with each pulse representing a predetermined unit of length. The overall length of each scale is substantially equal to the transverse length of the respective opening. The electric pulse generators or magnetic reproducing heads 29 and 30 are substantially similar to those utilized in magnetic tape recorders, and in the subject disclosure function to reproduce the pulses recorded from the scales. Thus, the reproducing heads will successively emit electric output pulses representing units of length as the heads move along the scales.

In order to move the photoelectric transducers 27 and 28 as well as the reproducing heads 29 and 30 from side to side along the magnetic scales 38 and 39, air pipes 40, 41, 42, 43, 44, and 45 are provided to communicate with the cylinders 21 and 22 by means of an electromagnetically operable four-way valve 46 and an air pipe 47 which provides pressurized air from a reservoir (not shown).

The electromagnetic four-way valve is provided with a solenoid 48 at one end thereof so as to alter the fluid path changing the manner of communication of the valve body from one state to the other when the solenoid is energized by means of an electric signal. The valve includes a reset spring 49 to return the valve body to the original position after the solenoid has been actuated.

When de-energized, the valve body will maintain the position shown in FIG. 2 and pressurized air enters into the rightward portion of cylinder 21 and the leftward portion of cylinder 22 through pipe 47 into the first port of the valve body and through pipes 45, 43, and 44. Piston 23 and the associated piston rod 25 will subsequently move leftwards, as shown in FIG. 2, resulting in the corresponding movement of the photoelectric transducer 27 and magnetic reproducing head 29. Similarly, piston 24 and rod 26 will move rightward, as shown in FIG. 2, resulting in the corresponding movement of photoelectric transducer 28 and reproducing head 30. During movement of the beforementioned parts, the air positioned leftwardly of the piston 23 within the cylinder 21 will be exhausted to the atmosphere through pipes 40 and 42 and the second port of the valve. Similarly, air positioned rightwardly of piston 24 within cylinder 22 will be exhausted to the atmosphere through pipes 41 and 42, as well as the second port of the valve body. Thus, movement of pistons 23 and 24 is effected without any substantial interference. The photoelectric transducers with the associated reproducing heads will stop at the most extended position which can be regarded as the starting positions for measuring the width of the web.

Position detectors 49 and 50 are provided adjacent the respective starting positions of the photoelectric transducers 27 and 28 with the associated reproducing heads 29 and 30 to detect the starting positions whereby a starting signal can be emitted for measuring the width of the web.

A controller 51 is provided for energizing the necessary elements mounted within the sensor 17 during the measuring operation. The controller is set to initiate the measuring operation upon receipt of two position detecting signals from detectors 49 and 50 through conductors 52 and 53. However, in the above-described state, the valve body of the four-way valve 46 cannot change its position from that shown in FIG. 2. The controller is also arranged so as to receive an electric signal through a conductor 54, which signal represents the presence of the web 10 in the measuring position and that the web 10 has come to a stop. It can be readily understood that the arrival of the web to the measuring position can be readily detected by means of any conventional device such, for example, as a limit switch, photoelectric position detecting device, or the like. When the aforesaid three input signals have been received by the controller, a control signal is emitted as an output to conductors 54 and 55. The signal from conductor 54 energizes solenoid 48 of the four-way valve 46 so as to change the position of the valve body to the far right position, as shown in FIG. 2, thereby placing the leftward port of the valve body in communication between pipe 47 and pipes 42, 40, and 41. Thus, the piston 23 will move rightwardly, as shown in FIG. 2, with the associated photoelectric transducer 27 and magnetic reproducing head 29. At the same time, piston 24 will move leftwardly with the associated photoelectric transducer 28 and magnetic reproducing head 30.

During the aforesaid movement of the transducers and magnetic reproducing heads, the magnetic reproducing heads will reproduce electric pulses responsive to the length of scale along which the head travels. The pulses reproduced through the heads are fed to a pair of registers 57 and 58 through conductors 59 and 60. The other inputs to the registers are supplied from photoelectric transducers 27 and 28 through conductors 61 and 62, respectively.

It can be seen that the transducer 27 will generate an electric signal during its movement from the initial position to the far left edge of web 10 when the light emitted from source 36 is interrupted by the web. Similarly, the transducer 28 will generate an electric signal as it is moved from the far right position to the right edge of the web 10 where the light emitted from source 37 is interrupted by the web.

The electric signals generated from transducers 27 and 28 act to cause registers 57 and 58 to count the pulses emitted from reproducing heads 29 and 30, respectively. Both of the counters 57 and 58 will start the counting operations due to receiving a starting signal from the controller 51. The contents of register 57 will become equal to the number of pulses emitted from reproducing head 29 during which the reproducing head will move from the initial or leftmost position to the left edge of the web at which point the light to be received by transducer 27 will be interrupted by the web and the electrical output signal of the transducer will stop. Similarly, the contents of register 58 will become equal to the number of pulses emitted by reproducing head 30 during which the reproducing head will continue to move from the initial or far right position to the right edge of the web at which point the light to be received by transducer 28 will be interrupted by the web and the electrical output signal of the transducer will stop.

It can be readily understood that the beforementioned movements of the transducers 27 and 28, as well as the associated reproducing heads 29 and 30, are extremely quick, since these members are driven by the piston-cylinder assemblies 19 and 20 in which pressurized air is employed as the driving medium. As a result, the counting operations in counters 57 and 58 are made at relatively high speed depending upon the traveling speeds of the reproducing heads.

The start signal emitted by controller 51 is supplied to a main or reversible register 63 through conductor 55 so as to begin the counting operation. The main counter receives still another input 64 for creating reference input pulses which are generated by a reference pulse generator 64. When the start signal arrives at the main register, the register will count the reference pulses. The reference pulses depend upon the distance between the opposed initial positions of the reproducing heads.

In this way, the main register first counts the reference pulses. At the same time, the main register receives the sum of the counted contents of both sub-registers 57 and 58 through conductors 65 and 66, respectively, and these are counted down or substracted from the reference pulses which are counted up.

It will be readily understood that the final contents of the main or reversible register represents the difference between the reference pulses and the other pulses which are counted up in the sub-registers resulting in a display of the width of the web by means of digital numbers.

Once the measuring operation has been completed, the main or reversible register generates a stop signal for the controller through conductor 67. Thus, the start signal being emitted by the controller will cease, whereby the valve body of the electromagnetic valve 45 will be returned to the initial position. Thus, both electric transducers 27 and 28, as well as the associated magnetic reproducing heads 29 and 30, will return to their initial positions and these positions will be detected by the position detectors 49 and 50 such that the apparatus will be ready for the next measuring operation.

It can be readily seen that the beforementioned measurement process can alternatively be effected by manually operating the push button 68 when the web to be measured is in position.

In accordance with the above-described embodiments, it is possible to measure the width of a web or sheet extremely rapidly because of the provision of an improved counting system which acts to count differences obtained by subtracting pulses. As described above, the pulses generated by the magnetic reproducing heads travelling along pre-recorded magnetic scales from one end thereof to the edge portions of the web material are subtracted from other pre-set pulses representing a predetermined width of web material. The operation is carried out in an extremely rapid manner because the reproducing heads are driven at high speed by means of pneumatic piston-cylinder assemblies along relatively short strokes associated with the magnetic scales.

In the described embodiment, it has been assumed that the counting operation for measuring has been performed when the magnetic reproducing heads 29 and 30 are driven from the outside ends of scales 38 and 39 to the innermost ends thereof. However, it is, of course, well within the scope of the present invention to effect the counting operation for measuring by driving the magnetic reproducing heads 29 and 30 from the innermost reference ends of the scales 38 and 39 to the outside ends thereof.

In this case, the photoelectric transducers 27 and 28 will not generate their output signals during travel from the aforesaid innermost ends of the scales to the opposite ends of the web 10 because of the lack of illumination. During this travel of the transducers, the pulses reproduced from scales 38 and 39 by the reproducing heads 29 and 30 will be counted up in sub-registers 57 and 58, and as soon as the transducers are driven over the opposite ends of web 10, the aforesaid counting operations of the sub-registers 57 and 58 will cease as a result of stop signals from the photoelectric transducers. The contents in the sub-registers are added to the reference pulses from the reference pulse generator 64 in the main register 63.

Both of the heads 29 and 30, as well as transducers 27 and 28, will continue to move toward the outside ends of scales 38 and 39, and when in these positions, the detectors 49 and 50 will generate electric signals to reset the controller 51 for the next measuring operation. When the controller is re-set, all of the registers 63, 57, and 58 are re-set at zero and the electromagnetic valve 46 will make the fluid actuators 19 and 20 function to cause the heads 29 and 30, as well as the transducers 27 and 28, to return to their innermost initial positions. The display of the main register 63 can be transmitted to a printer (not shown) through a conductor 69 to type out a record thereof prior to the registers being re-set to zero.

Obviously, various modifications and variations of the present invention are possible in light of the above teachings. For example, it is well within the scope of the present invention to reverse the position of the elements above and below the web materials such that the sensor including magnetic recorded scale, the magnetic induction type pulse generator, and the fluid actuator for these elements may all be located beneath the steel sheet or web material to be measured. In this case, the light source would be located above the web material. Moreover, it should be apparent that where the web material to be measured is in a high temperature state, the photoelectric transducer may be of a type sensitive to infrared rays emitted from the sheet, and the conventional light source may be eliminated. Although the invention has been described by way of example for measuring the width of sheets or web materials, it should be apparent that the invention can be readily adapted for measuring the length and/or thickness of objects. It is therefore to be understood that within the scope of the teachings herein and the appended claims, the invention may be practiced otherwise than as specifically described herein.

What is claimed as new and desired to be secured by letters patent of the United States is:

1. Apparatus for measuring the dimensions of objects comprising:
    a carrier device for successively transporting objects to a measuring zone to have at least one dimension thereof measured,
    a pair of magnetically recorded scales mounted on a fixture at said measuring zone and positioned substantially perpendicular to the transporting direction of said objects, said pair of scales being located across opposite edge portions of said object and being relatively short in length,
    a pair of magnetic reproducing heads magnetically coupled with said scales and being capable of movement along said scales,
    a pair of photoelectric transducers integrally mounted with said reproducing heads and being capable of movement with said heads,
    a pair of fluid actuators mounted on said fixture for moving said magnetically reproducing heads along said recorded scales with said photoelectric transducers,
    a pair of first registers arranged to count electric pulses produced by said reproducing heads when said respective photoelectric transducers allow said registers to count, and,
    a second register arranged to count the algebraic sum of the reference pulses corresponding to a reference dimension of said object and the total pulses stored in said pair of first registers.

2. An apparatus for measuring the dimensions of objects according to claim 1, wherein
    said second register is a subtracting register which acts to subtract the total pulses stored in said pair of first registers from the amount of reference pulses which corresponds to a predetermined dimension,
    said first registers being connected, respectively, to said photoelectric transducers for receiving control signals therefrom in the absence of said object,
    whereby said first registers count pulses produced by said reproducing heads as they are respectively moved from one reference end of each of said recorded scales to the respective opposite side edges of said object to be measured, said one reference end of each of said scales being located outwardly of the opposite side edges of said object.

3. An apparatus for measuring the dimensions of objects according to claim 1, wherein
    said second register is an adding register which acts to add the total pulses stored in said pair of first registers to the reference pulses corresponding to a predetermined dimension of said object,
    said first registers being connected respectively to said photoelectric transducers for receiving control signals therefrom in the presence of said object,
    whereby said first registers count pulses produced by said reproducing heads as they are moved from the innermost reference end of each of said recorded scales to the respective opposite side edges of said object to be measured.

4. An apparatus for measuring the dimensions of objects according to claim 1, wherein
    said carrier mounting said objects is arranged to move between said photoelectric transducers and an elongated light source means which is located across the transporting direction of the objects,
    whereby said pair of first registers are allowed to count pulses produced from said recorded scales by said reproducing heads during the period of time that said transducers receive light which emanates from said light source.

5. An apparatus for measuring the dimensions of objects according to claim 1, wherein
    said carrier mounting said objects to be measured is arranged to move between said photoelectric transducers and an elongated light source means which is located across the transporting direction of said objects,
    whereby said pair of first registers are allowed to count pulses from said reproducing heads during the period of time that said object interrupts the light to be received by said respective transducers.

6. An apparatus for measuring the dimensions of objects according to claim 1, wherein
    said photoelectric transducers are so constructed as to respond to infrared rays emitted from heated objects.

7. An apparatus for measuring the dimensions of objects according to claim 1, wherein
    controlling means are provided in response to the completion of the positioning of said object and the initial positioning of said respective reproducing heads and transducers for causing said first and second registers to start counting and for starting the movement of said reproducing heads with said photoelectric transducers along said respective recorded scales by said fluid actuators.

* * * * *